UNITED STATES PATENT OFFICE 2,606,179

PROCESS FOR THE POLYMERIZATION OF ETHYLENE IN THE LIQUID PHASE WITH "ALFIN" CATALYSTS

Thomas Boyd, Springfield, Mass., assignor to Monsanto Chemical Company, St. Louis, Mo., a corporation of Delaware No Drawing. Application March 23, 1950, Serial No. 151,552

6 Claims. (Cl. 260—94.9)

This invention relates to a process for the polymerization of ethylene. More particularly the invention relates to a process for the polymerization of ethylene at relatively low temperatures and pressures.

The polymerization of ethylene in most of the known processes and with the usual catalysts is carried out at temperatures above 100° C. and at pressures which range as high as 3,000 atmospheres. These conditions necessitate expensive high pressure apparatus and extraordinary precautions to prevent accidents. The polymers produced are generally quite tough and inert to chemical media. However, for many uses the polymers so produced are soft and have such a high crystallinity that they are not transparent.

One object of this invention is to provide a process for the polymerization of ethylene.

A further object is to provide a process for the polymerization of ethylene at temperatures below 100° C. and pressures below 55 atmospheres.

Another object is to provide a process for the polymerization of ethylene at temperatures at or below the critical temperature thereof and at pressures at or below its critical pressure.

Still another object is to provide transparent ethylene polymers.

These and other objects are attained by polymerizing ethylene in an aliphatic hydrocarbon solvent using as catalysts a combination of the sodium alkoxide derived from a methyl alkyl carbinol and the sodium alkenyl derived from an olefin.

The following examples are given in illustration and are not intended to limit the scope of this invention. Where parts are mentioned they are parts by weight.

Example I

Dissolve 100 parts of liquid anhydrous ethylene in 200 parts of anhydrous pentane at 0° C. To the solution, add 0.1 part of an equimolar mixture of sodium isopropoxide and allyl sodium with constant agitation. The reaction is carried out in the substantial absence of air and oxygen and a temperature of 0° C. at a pressure of 50 atmospheres is maintained throughout the reaction. At the end of one hour, the pressure is released which serves to blow out unreacted ethylene. A suspension of solid polyethylene in pentane is obtained from which the resin is recovered by simple evaporation of the solvent. If desired, the catalyst may be destroyed by adding water or alcohol to the suspension before separating the resin from the pentane, the decomposition products being substantially eliminated from the resin by decantation of the major portion of the pentane. The polymer obtained has a molecular weight of about 20,000 and is less crystalline than polymers prepared at high temperatures and pressures so that articles prepared therefrom are clear and transparent. The polyethylene prepared in this manner is stable to light and heat without the addition of the conventional stabilizers.

Example II

Example I is repeated except that 5 parts of the catalyst mixture are used. The reaction proceeds in the same manner but the pressure is released after about 30 minutes and the polymer recovered. The product is a clear tough polyethylene having a molecular weight of about 15,000.

Example III

Example I is repeated except that 0.001 part of catalyst is used. The reaction in this instance, is allowed to continue for about 10 hours. The polymer obtained has a molecular weight of about 50,000 and is somewhat difficult to mold. When obtained, the moldings are clear and relatively hard.

Example IV

Water- and oxygen-free liquid ethylene is dissolved in about three times its weight of water- and oxygen-free butane at about —80° C. To the solution is added about 1 part of an equimolar mixture of sodium isopropoxide and 1-octenyl sodium. The solution is maintained at —80° C. under a pressure of about 10 atmospheres for about 30 hours. The pressure is then released and the temperature slowly raised to room temperature (about 30° C.). During this process butane and unreacted ethylene evaporate leaving a solid polyethylene containing the catalyst. The polymer is washed with water to decompose and remove the catalyst and then the polymer is dried. The resulting polymer has a molecular weight of about 35,000 and is tough, clear and stable to light.

The catalysts of this invention are the so-called alfin catalysts which are mixtures of sodium alkenyls derived from olefins and sodium alkoxides derived from methyl alkyl carbinols. In general, the olefins which are operative are the 2-alkenes and 1-alkenes containing from 3 to 10 carbon atoms. As shown in Example IV, it is not necessary for the organic part of the two components to have the same number of carbon atoms. For most efficient results the two components of the catalyst system should be used in equimolar proportions. However, polymerization can be obtained with up to 4 mols of the alkanol derivative to 1 mol of the olefinic derivative. It is not desirable to use more of the olefinic derivative than the alkanol derivative although a certain amount of polymerization can be obtained with such a mixture.

Several of the polymerization conditions are critical to render the process operable. In the first place water and oxygen must be rigidly excluded from the reaction medium since water decomposes the catalysts and oxygen interferes with the polymerization reaction. For best results the polymerization is carried out at temperatures below the critical temperature of ethylene, i. e., 9° C., so that the monomeric ethylene can be maintained in the liquid state at pressures of 55 atmospheres of less. Temperatures as low as −80° C. may be used to obtain a slower reaction which in some respects is more easily controlled. It is possible to operate at temperatures as high as 100° C. in a solvent whose critical temperature is higher than that temperature since ethylene may be retained in solution in such media at pressures of about 55 atmospheres and above. However, the reaction is difficult to control at temperatures above the critical temperature of ethylene. The pressure throughout the reaction should be high enough to keep the ethylene in the liquid phase. At 9° C., the pressure should be at least 51 atmospheres. Higher pressures may be used up to 1,000 atmospheres although it is preferred to work with a maximum of 55 atmospheres. As the temperature of the polymerization reaction is lowered the pressure may also be lowered so that at −80° C. only 10 atmospheres pressure is needed.

The reaction is preferably carried out in a solvent comprising an aliphatic hydrocarbon which is liquid at the temperature of the reaction. Pentane is convenient to use at most temperatures but other compounds such as isobutane, hexanes, octanes, decanes, etc. may be used. If the lower part of the temperature range is used it is possible to use butane as a solvent since it is a liquid below −6° C. The amount of solvent should be at least equal on a weight basis to the amount of ethylene present and preferably is considerably more i. e., up to ten times the weight of ethylene.

One of the advantages of the process of this invention is that the polyethylene formed during the reaction is insoluble in the monomer solvent and may be recovered easily therefrom by simple drying processes. This fact lends itself to an easy adaptation of the system to continuous polymerization since the polymer will settle to the bottom of the reaction vessel and may be drawn off therefrom as ethylene and catalyst are added at the top.

In a further embodiment of the invention, the hydrocarbon solvent may be omitted and the polymerization carried out by dispersing the catalyst in the liquid ethylene. Since polyethylene is a solid at the temperatures used, it is not feasible to carry the reaction to completion. For best results, the polymerization without solvent is stopped at about 25% conversion, pressure is released accompanied by evaporation of the unreacted ethylene and the solid polymer obtained is washed free of catalyst with water. In this embodiment, the amount of catalyst should be restricted to from 0.001 to 0.01 part per 100 parts of ethylene.

Instead of preparing a homopolymer of ethylene, copolymers thereof with vinylidene monomers containing only hydrogen, carbon and oxygen and being free from reactive groups such as keto groups may be prepared. The materials to be copolymerized with the ethylene must either be liquids at the temperature of the reaction or must be soluble in the hydrocarbon solvents. Among the vinylidene compounds which may be used are vinyl hydrocarbons such as aliphatic olefins, aromatic olefins, diolefins, polyolefins, vinyl and allyl esters and ethers, esters of acrylic acid and alpha substituted acrylic acids and esters of alpha, beta ethylenically unsaturated dicarboxylic acids. Eethylene should constitute at least 50% by weight of the copolymer.

The polymers obtained by polymerization of ethylene in the presence of the alfin catalysts at temperatures at or below the critical temperature of ethylene are distinguished by their clarity, hardness and stability. They may be easily compounded with conventional additives such as lubricants, fillers, colorants, etc. and may be fabricated by molding, calendering, extrusion and other standard procedures.

It is obvious that many variations may be made in the products and processes of this invention without departing from the spirit and scope thereof as defined in the appended claims.

What is claimed is:

1. A process which consists of polymerizing ethylene in the liquid state at temperatures from −80° C. to 9° C. and at pressures of from 10 atmospheres at −80° C. to 55 atmospheres at 9° C. in the presence of a catalyst consisting of a mixture of a sodium alkenyl derived from an aliphatic olefin and a sodium alkoxide derived from a methyl alkyl carbinol.

2. A process which consists of polymerizing ethylene in an aliphatic hydrocarbon solvent at temperatures from −80° C. to 9° C. at pressures of from 10 atmospheres at −80° C. to 55 atmospheres at 9° C. in the presence of a catalyst consisting of a mixture of a sodium alkenyl derived from an aliphatic olefin and a sodium alfloxide derived from a methyl alkyl carbinol.

3. A process as in claim 2 wherein the catalyst consists of a mixture of 1 mol of a sodium alkenyl derived from an aliphatic olefin and from 1 to 4 mols of a sodium alkoxide derived from a methyl alkyl carbinol.

4. A process as in claim 3 wherein the sodium alkenyl derived from an aliphatic olefin is sodium allyl.

5. A process as in claim 3 wherein the sodium alkoxide derived from a methyl alkyl carbinol is the sodium alkoxide of isopropanol.

6. A process as in claim 3 wherein the catalyst consists of 1 mol of sodium allyl and 1 mol of sodium isopropoxide.

THOMAS BOYD.

REFERENCES CITED

The following references are of record in the file of this patent:

Morton et al., J. Am. Chem. Soc., 69, 950–961 (1947).